(12) United States Patent
Kuribayashi et al.

(10) Patent No.: US 6,235,130 B1
(45) Date of Patent: May 22, 2001

(54) HYDROGEN ABSORBING ALLOY POWDER AND ELECTRODES FORMED OF THE HYDROGEN ABSORBING ALLOY POWDER

(75) Inventors: Yukihiro Kuribayashi; Hiroto Sugahara; Masatoshi Ishii; Satoshi Shima, all of Fukui-ken (JP)

(73) Assignee: Shin-Etsu Chemical Co., Ltd. (JP)

( * ) Notice: Subject to any disclaimer, the term of this patent is extended or adjusted under 35 U.S.C. 154(b) by 0 days.

(21) Appl. No.: 09/265,657

(22) Filed: Mar. 10, 1999

(30) Foreign Application Priority Data

Mar. 17, 1998 (JP) .................................................. 10-066804
Nov. 13, 1998 (JP) .................................................. 10-323326

(51) Int. Cl.$^7$ .................................................. H01M 4/04
(52) U.S. Cl. .................................................. 148/513; 420/900
(58) Field of Search .................................................. 148/513, 514; 420/900

(56) References Cited

U.S. PATENT DOCUMENTS

| | | | | |
|---|---|---|---|---|
| 5,932,034 | * | 8/1999 | Ishii et al. | 420/900 |
| 5,935,732 | * | 8/1999 | Matsumura et al. | 420/900 |
| 6,010,582 | * | 1/2000 | Ise et al. | 148/513 |

FOREIGN PATENT DOCUMENTS

| | | |
|---|---|---|
| 62-223971 | 10/1987 | (JP) . |
| 06096766 | 4/1994 | (JP) . |
| 10176201 | 6/1998 | (JP) . |
| 96/31911 | * 10/1996 | (WO) . |

* cited by examiner

Primary Examiner—George Wyszomierski
(74) Attorney, Agent, or Firm—Henry D. Coleman; R. Neil Sudol; William J. Sapone

(57) ABSTRACT

Provided is a hydrogen absorbing alloy powder for use in nickel-metal hydride storage batteries having a high capacity, excellent initial characteristics and a long life. Specifically provided is a process for the production of a hydrogen absorbing alloy powder which includes the steps of treating a hydrogen absorbing alloy powder with an acid solution, and subsequently treating the hydrogen absorbing alloy powder with a solution containing a condensed phosphoric acid having 2 to 20 phosphorus atoms per molecule and/or phytic acid, as well as an electrode formed of the hydrogen absorbing alloy powder produced by the above process. Also provided is a hydrogen absorbing alloy powder of the $AB_5$ type in which A is exothermic metal and B is endothermic metal, the hydrogen absorbing alloy powder being obtained by providing a hydrogen absorbing alloy in which A comprises a mixture composed of 20 to 50% by weight of Ce, 20 to 50% by weight of La, and the balance comprising rare earth elements other than Ce and La and inclusive of Y (yttrium), treating the hydrogen absorbing alloy powder with an acid solution, and further treating the hydrogen absorbing alloy powder with a solution containing a phosphorus compound, as well as an electrode formed of this hydrogen absorbing alloy powder.

4 Claims, No Drawings

HYDROGEN ABSORBING ALLOY POWDER AND ELECTRODES FORMED OF THE HYDROGEN ABSORBING ALLOY POWDER

BACKGROUND OF THE INVENTION

1. Field of the Invention

This invention relates to a hydrogen absorbing alloy powder and electrodes formed of the same. More particularly, it relates to a hydrogen absorbing alloy powder which can suitably be used to form the negative electrodes of nickel-metal hydride storage batteries, and to electrodes formed of the same. Still more particularly, it relates to a hydrogen absorbing alloy powder for use in nickel-metal hydride storage batteries having a high capacity, excellent initial characteristics and a long life.

2. Description of the Related Art

Since the discovery of hydrogen absorbing alloys capable of absorbing and releasing hydrogen, they not only have been used as hydrogen storage means, but also have been more and more widely applied to heat pumps, batteries and the like. In particular, alkaline storage batteries using a hydrogen absorbing alloy powder for the negative electrode have already been put to practical use, and various attempts have successively been made to improve the capacity and life of the batteries in view of the hydrogen absorbing alloy used therefor.

That is, with respect to the initially investigated $LaNi_5$ alloy having a $CaCu_5$ type crystal structure, an improvement in capacity and life has been achieved by replacing a part of La with Ce, Pr, Nd and other rare earth elements to form misch metal (Mm), or by replacing a part of Ni with a metallic element such as Al, Co or Mn.

However, when such hydrogen absorbing alloys are used to form electrodes for batteries, the capacity and life of the resulting batteries can be improved, but their initial characteristics are reduced.

Generally, the capacity tends to become higher as the La content in Mm is increased. When the La content is 100%, a maximum capacity is obtained, but the cycle life becomes extremely poor. Moreover, when a part of Ni is replaced with Co, Mn, Al or the like in order to achieve a long life and prevent passivation, the equilibrium pressure is lowered to cause a reduction in low-temperature characteristics and high rate discharge characteristics. Accordingly, in order to bring about an improvement in life, it has conventionally been proposed to use Mm in which a part of La is replaced with the other light rare earth element (Ce, Pr or Nd), decrease the Ce content of Mm (Japanese Patent Provisional Publication No. 62-223971/'87), or, on the contrary, add Ce thereto positively (Japanese Patent Provisional Publication No. 6-96766/'94). However, it has been impossible to obtain a battery having a high capacity, a long life and excellent characteristics solely by resorting to an improvement in alloy composition.

Initial characteristics are generally expressed in terms of the number of charging-discharging cycles repeated until a maximum capacity is reached, and they are considered to be higher as the number of cycles is smaller.

Usually, initial characteristics are evaluated by the capacity in the first cycle. However, a battery having low initial characteristics has the disadvantage that, when it is fabricated into a sealed type one, the balance between the positive and negative electrodes is lost to cause a reduction in the capacity and life of the battery.

In order to overcome the above-described disadvantages, it has been conventional practice to treat a hydrogen absorbing alloy with an aqueous alkaline solution or inorganic acid. However, the alkali treatment has been disadvantageous in that treating conditions such as a high concentration and a high temperature are required and it is difficult to wash the treated hydrogen absorbing alloy with water. In addition, the hydrogen absorbing alloy treated by the alkaline solution or by inorganic acid undesirably undergoes a compositional change because the alloy is subject not only to surface oxidation during treatment but also to oxidation during drying and storage. Hence, the difficulty in handleability and safety makes a procedure for forming negative electrodes for batteries more complicated.

SUMMARY OF THE INVENTION

Accordingly, an object of the present invention is to provide a negative electrode for batteries which is formed of a hydrogen absorbing alloy, exhibits excellent initial characteristics, and is suitable for the fabrication of a sealed type battery having a high capacity and a long life, as well as a hydrogen absorbing alloy used therefor.

In order to overcome the above-described disadvantages, the present inventors made intensive investigations on hydrogen absorbing alloy powders for use in negative electrodes and processes for producing them. As a result, it was found that a hydrogen absorbing alloy powder having excellent storability and handleability can be easily produced by treating a hydrogen absorbing alloy powder with a solution containing a condensed phosphoric acid and/or phytic acid, and that, when this hydrogen absorbing alloy powder is used to form the negative electrodes of nickel-metal hydride storage batteries, the initial characteristics of the resulting batteries can be improved without reducing their capacity or life. This technique has already been proposed (Japanese Patent Provisional Publication No. 10-176201/'98). However, there still remains a need for further improvement in initial capacity and discharge capacity.

Accordingly, an object of the present invention is to provide a process for the production of a hydrogen absorbing alloy powder having excellent storability and handleability, as well as a negative electrode for use in nickel-metal hydride storage batteries which has excellent initial characteristics and a long life.

The present inventors made further investigations on the above-described treatment with a condensed phosphoric acid, and have now found that a further improvement in initial characteristics can be achieved by treating a hydrogen absorbing alloy powder with an acid solution prior to the treatment with a condensed phosphoric acid. The present invention has been completed on the basis of this finding.

Thus, the present invention relates to a process for the production of a hydrogen absorbing alloy powder which includes the steps of treating a hydrogen absorbing alloy powder with an acid solution, and subsequently treating the hydrogen absorbing alloy powder with a solution containing a phosphoric compound, especially a condensed phosphoric acid having 2 to 20 phosphorus atoms per molecule and/or phytic acid, and to an electrode formed of the hydrogen absorbing alloy powder produced by this process.

It has been found that, when a hydrogen absorbing alloy in which most of the rare earth elements present therein comprise Ce and La is treated with an acid solution, washed with water, and treated with a phosphorus compound, the initial characteristics of the resulting batteries can be improved more without reducing their capacity or life. The present invention has been completed on the basis of this finding.

More specifically, the present inventors made investigations with attention paid to the fact that the Ce content in Mm is an important point for the improvement of life and other characteristics, and have now found that, when a certain proportion of La present in a hydrogen absorbing alloy is replaced with Ce, and the hydrogen absorbing alloy powder is treated with an acid solution and then with a phosphorus compound to achieve a high initial capacity and a long life, negative electrodes for use in nickel-metal hydride storage batteries which have a high capacity and a long life can be formed by using the resulting hydrogen absorbing alloy. Thus, the present invention has been completed.

The above objects of the present invention are accomplished by a hydrogen absorbing alloy powder of the $AB_5$ type in which A is exothermic metal and B is endothermic metal, the hydrogen absorbing alloy powder being obtained by providing a hydrogen absorbing alloy in which A preferably comprises a mixture of rare earth elements containing 20 to 50% by weight of Ce and 20 to 50% by weight of La, treating the hydrogen absorbing alloy with an acid solution, and subsequently treating the hydrogen absorbing alloy with a phosphoric compound.

The hydrogen absorbing alloy powder of the present invention, when used to form the negative electrodes of nickel-metal hydride storage batteries, exhibits excellent initial characteristics and, moreover, can yield hydrogen absorbing alloy negative electrodes which are suitable for the fabrication of sealed type batteries having a long cycle life.

DETAILED DESCRIPTION OF THE PREFERRED EMBODIMENTS

No particular limitation is placed on the type of the hydrogen absorbing alloy used in the present invention, and it may be suitably selected from among various well-known hydrogen absorbing alloys used to form negative electrodes. In order to improve cycle life characteristics especially when it is used for batteries, hydrogen absorbing alloys of the $MmNi_5$ type are preferably used. In the aforesaid alloys, Mm is a mixture of rare earth elements such as La, Ce, Pr and Nd, and known as misch metal.

Among $MmNi_5$ alloys, alloys of the general formula $(La)_xR_{1-x}(Ni)_a(M)_b$ are preferably used in the present invention from the viewpoint of battery capacity and cycle life characteristics. In this formula, R is a rare earth metal other than La, and preferably at least one element selected from Ce, Pr and Nd; M is at least one element selected from Mn, Al, Co, Ti, Fe, Cu and Zr; and x, a and b are positive numbers. Preferably, x is in the range of 0.2 to 1, b satisfies $0 < b \leq 2.0$, and (a+b) is in the range of 4.0 to 6.0.

In order to improve cycle life characteristics, M preferably contains Cr or Al, and more preferably contains Mn in addition to Cr or Al.

In the hydrogen absorbing alloy of the present invention, the component A, which is preferably a mixture of rare earth elements, contains 20 to 50% by weight of Ce. Moreover, in the present invention, a part of Ni may be replaced with Co or Al, and may further be replaced with a metallic element such as Mn, Fe, Ti, Cu or Zr. When an alloy having such a Ce-rich composition is used to form negative electrodes for use in nickel-metal hydride storage batteries, it becomes possible to produce batteries having a long life.

Moreover, the component A also contains 20 to 50% by weight of La. This makes it possible to secure a high capacity.

The alloy used in the present invention is represented by $AB_5$ in which A is exothermic metal and B is endothermic metal. More particularly, the rare earth metals contained therein may include 20 to 50% by weight (preferably 40 to 50% by weight) of La, 20 to 50% by weight (preferably 30 to 40% by weight) of Ce, and the balance comprising rare earth elements other than Ce and La and inclusive of Y. In particular, Pr or Nd is preferably selected and used as other rare earth elements. More preferably, the combined amount of La and Ce is determined so as to be in the range of 70 to 90% by weight, especially in that this brings about an improvement in both initial characteristics and cycle life. The reason why the compositional range of A has been defined as above is that, outside the above-defined range, a reduction in initial characteristics and capacity or a reduction in cycle life may result.

In the practice of the present invention, a hydrogen absorbing alloy is obtained, for example, by melting a mixture of metallic elements having the above-described composition in a well-known high-frequency induction furnace or other furnace having an atmosphere of an inert gas. Then, using a ball mill, jet mill, pulverizer or the like, this hydrogen absorbing alloy is reduced to a powder having a preferable average particle diameter of 5 to 50 μm, more preferably 15 to 50 μm. Thereafter, this powder is soaked in an acid solution with stirring.

Alternatively, a hydrogen absorbing alloy powder produced according to a rapid quenching method such as a rapid roll quenching or gas atomization may also be used.

According to the present invention, in order to produce a hydrogen absorbing alloy powder which exhibits excellent initial characteristics, a high capacity and a long life when it is used in batteries, the above-described hydrogen absorbing alloy is treated with a solution of an organic acid (in particular, a sulfur-containing organic acid) and washed with water as required. Subsequently, this hydrogen absorbing alloy is treated with a phosphorus compound, which makes it possible to fabricate batteries having excellent initial characteristics.

In the practice of the present invention, a hydrogen absorbing alloy powder is treated with an acid solution, washed several times with water to remove any excess acid from the alloy surface, and then treated with a phosphorus compound.

After treatment with the phosphorus compound, the hydrogen absorbing alloy powder is dried without washing it with water, so that the phosphorus compound becomes adsorbed to the alloy surface and covers it. Thus, there is obtained a hydrogen absorbing alloy powder in accordance with the present invention.

The acid solution used in the present invention preferably comprises a solution containing an organic acid or its salt.

Preferably, the organic acid used in the present invention is an organic acid having a sulfur-containing group. Such organic acids include sulfonic acids ($R^1$—$SO_3H$), sulfinic acids ($R^2$—$SO_2H$) and sulfenic acids ($R^3$—SOH). In the formulae, $R^1$, $R^2$ and $R^3$ each independently represent a monovalent aliphatic hydrocarbon radical (preferably having 1 to 10 carbon atoms), an aromatic hydrocarbon radical, an amino group or the like, and these radicals or groups may be substituted by hydrophilic groups such as carboxyl, amino, hydroxy and sulfonic acid groups.

Specific examples of these organic acids include sulfamic acid, sulfanilic acid, sulfaminobenzoic acid, sulfosalicylic acid, sulfobenzoic acid and sulfoacetic acid.

These organic acids may be used irrespective of the position of the substituent group (i.e., they may include various isomers), and may be used alone or in admixture.

Among these organic acids, sulfosalicylic acid, sulfamic acid and sulfoacetic acid are preferably used in the present invention. Especially preferred are 5-sulfosalicylic acid and 2-hydroxyl-sulfobenzoic acid.

The organic acid salts which can be used in the present invention include, for example, Na, K and Ca salts. Especially preferred are the Na, K and Ca salts of sulfosalicylic acid, sulfamic acid and sulfoacetic acid. In present invention, these organic acid salts may be used alone or in admixture of two or more.

Although the acid solution used in the present invention preferably comprises a solution containing an organic acid or its salt, a solution containing both of them may also be used.

Examples of the solvent constituting the acid solution include water, alcohols of 1 to 5 carbon atoms, ethers, and ketones (e.g., acetone). From the viewpoint of workability, it is preferable that the acid solution be in the form of an aqueous solution.

When a solution of an organic acid is used as the acid solution, the concentration of the acid solution is preferably in the range of 0.01 to 10% by weight.

The treatment with the acid solution used in the present invention is preferably carried out at a temperature ranging from room temperature (20° C.) to 100° C. and more preferably from 20 to 60° C. If desired, the treatment may be carried out in a closed vessel under an elevated pressure up to 10 kgf/cm$^2$. For purposes of industrial production, treatment under heated or cooled conditions is undesirable from an economic point of view because a considerable equipment cost is required. In particular, treatment under cooled conditions is not practical because an unduly long treating time is required.

Under any treating conditions, the treating time is in the range of 0.1 to 10 hours. The treating time may be suitably controlled by reducing it as the temperature becomes higher or extending it as the temperature becomes lower.

The treatment with the acid solution used in the present invention is preferably carried out at a temperature ranging from room temperature to 100° C., and the treatment with a condensed phosphoric acid and/or phytic acid is preferably carried out at a temperature ranging from room temperature to 130° C.

In the treating bath containing an organic acid, the organic acid is preferably used in an amount of about 0.01 to 30 parts by weight (i.e., resulting in about 0.01 to 23% by weight), more preferably 0.5 to 10 parts by weight, per 100 parts by weight of the hydrogen absorbing alloy being treated. Preferably, this organic acid is dissolved in a solvent so as to give a concentration of 0.01 to 10% by weight.

If the amount of the organic acid or its salt is greater than 30 parts by weight, an improvement in initial characteristics can be achieved, but the attainable capacity may be reduced. If it is less than 0.01 part by weight, the desired treating effect may not be obtained.

In the practice of the present invention, the hydrogen absorbing alloy having been treated with the acid solution is washed several times with water and then treated with a phosphorus compound. Specifically, the phosphorus compound preferably includes condensed phosphoric acid of the general formula $H_{n+2}P_nO_{3n+1}$ and polymetaphosphoric acid of the general formula $(HPO_3)_m$ which has a cyclic molecule formed by the condensation of orthophosphoric acid, wherein n and m are each an integer of 2 to 20, more preferably 2 to 10. The phosphorus acid compound is preferably used in an amount of 0.01 to 30 parts by weight per 100 parts by weight of the alloy (i.e., resulting in about 0.01 to 23% by weight). More preferably, it is used in an amount of 0.1 to 10 parts by weight. If the amount of the phosphorus compound is unduly small, the resulting alloy powder will have poor storability, while if it is unduly great, the resulting alloy powder may conversely show a reduction in the degree of activation.

The reason why a condensed phosphoric acid having 2 to 20 phosphorus atoms is preferred is as follows. Phosphoric acid ($H_3PO_4$) improves initial activation to some extent, but tends to oxidize the alloy surfaces and thereby cause a reduction in attainable capacity. If the number of phosphorus atoms is greater than 20, the hydrogen absorbing and hydrogen-releasing reactions may be inhibited to cause a decrease in the amount of hydrogen absorbed.

In the present invention, the phosphorus compound is used in the form of a solution containing it. The solvents which can be used for this purpose include water, alcohols (preferably having 1 to 5 carbon atoms), aromatic hydrocarbon solvents (e.g., toluene), and ketones (e.g., acetone). Moreover, solvent mixtures such as water-alcohol and acetone-toluene may also be used.

Preferably, the phosphorus compound is used in the form of a solution having a concentration of 0.01 to 10% by weight.

In the present invention, a mixture of such condensed phosphoric acids may be used. Moreover, phytic acid may also be used in combination with or in place of the condensed phosphoric acid.

The concentration of the phosphoric acid compound is preferably in the range of about 0.01 to 10 parts by weight (i.e., resulting in about 0.01 to 10% by weight), more preferably about 0.1 to 1 part by weight, per 100 parts by weight of the hydrogen absorbing alloy being treated. If the concentration is less than 0.01 part by weight, the resulting alloy powder will have poor storability, while if it is greater than 10 parts by weight, the resulting alloy powder may show a reduction in the degree of activation. The concentration of the condensed phosphoric acid and/or phytic acid refers to the concentration of the condensed phosphoric acid when the condensed phosphoric acid is used alone, the concentration of phytic acid when phytic acid is used alone, or the combined concentration of the condensed phosphoric acid and phytic acid when they are used in combination.

The treatment with the phosphorus compound used in the present invention is preferably carried out at a temperature ranging from room temperature (20° C.) to 130° C. If desired, the treatment may be carried out in a closed vessel under an elevated pressure up to 10 kgf/cm$^2$. For purposes of industrial production, treatment under heated or cooled conditions is undesirable from an economic point of view because a considerable equipment cost is required. In particular, treatment under cooled conditions is not practical because an unduly long treating time is required.

Under any treating conditions, the treating time is in the range of 0.1 to 10 hours. The treating time may be suitably controlled by reducing it as the temperature becomes higher or extending it as the temperature becomes lower.

No particular limitation is placed on the method for carrying out the treatment with an acid solution (e.g., a solution of an organic acid) or the treatment with a solution containing a condensed phosphoric acid according to the present invention, and there may be employed any well-known method that comprises, for example, soaking the hydrogen absorbing alloy in the above-described solution.

However, in order to carry out the treatment satisfactorily, it is preferable to soak a finely divided powder of the hydrogen absorbing alloy in the treating solution. Especially when the treating solution is stirred, the initial characteristics of electrodes formed of the resulting powder can further be improved.

Now, the method for forming negative electrodes for batteries by using the hydrogen absorbing alloy powder produced according to the present invention.

A well-known binder such as polyvinyl alcohol, methylcellulose, carboxymethylcellulose, PTFE (polytetrafluoroethylene) or high polymer latex is added to the hydrogen absorbing alloy powder in an amount of 0.1 to 20 parts by weight per 100 parts by weight of the alloy, and mixed therewith to form a paste. If necessary, 0.5 to 20 parts by weight of an electrically conducting filler such as carbon-graphite powder, Ni powder or Cu powder may also be added thereto. Thereafter, three-dimensional electrical conductors (e.g., porous bodies of foamed nickel or bodies made of Ni fibers) or two-dimensional electrical conductors (e.g., punching metals) are uniformly filled with the paste, dried in vacuo, and then pressed to form negative electrodes for batteries in accordance with the present invention. Such a negative electrode, together with a well-known positive electrode formed of nickel, a separator (e.g., polypropylene) and an electrolytic solution (e.g., a KOH solution), may be incorporated into a container to fabricate a nickel-metal hydride storage battery.

When the hydrogen absorbing alloy having undergone the acid treatment is used to form negative electrodes for batteries, an improvement in initial characteristics can be achieved. The reason for this is presumed to be that the oxide film present on the surface of the hydrogen absorbing alloy is removed by the acid to establish intimate contact between the alloy and the electrolytic solution, a Ni-rich layer is formed on the surface of alloy particles by the acid treatment, and the alloy surface is coated with the phosphorus compound adsorbed thereto.

According to the present invention, a hydrogen absorbing alloy powder which not only has a high activity but also exhibits excellent storability and handleability can be produced very easily. Moreover, nickel-metal hydride storage batteries having excellent initial characteristics can be fabricated by using the hydrogen absorbing alloy powder produced according to the present invention.

In addition to the above-described formation of electrodes, the hydrogen absorbing alloy powder produced according to the present invention may also be used as a hydrogen storage means for heat pumps and the like.

The present invention is further illustrated by the following examples. However, these examples are not to be construed to limit the scope of the invention.

EXAMPLES 1–8

Various alloy components were mixed in such proportions as to give an alloy composition represented by $R'_{1.0}Ni_{3.8}Co_{0.7}Mn_{0.2}Al_{0.3}$ in which R' contains 20–50 wt % La and 20–50 wt % Ce. These mixtures were melted in a high-frequency melting furnace having an atmosphere of argon to yield a total of eight hydrogen absorbing alloys.

Subsequently, each of these hydrogen absorbing alloys was heat-treated at 1,050° C. for 8 hours in an atmosphere of argon, and then pulverized to yield a hydrogen absorbing alloy powder having an average particle diameter of 40 $\mu$m.

Moreover, this hydrogen absorbing alloy powder was subjected to a surface treatment. This surface treatment was carried out by treating the powder with sulfosalicylic acid, washing it with water, and then treating it with a condensed phosphoric acid. The conditions for the sulfosalicylic acid treatment were such that a 5 wt % aqueous solution of sulfosalicylic acid was added to the powder in an amount of 36 milliliter per 30 g of the hydrogen absorbing alloy, and stirred at 60° C. for 15 minutes. After the sulfosalicylic acid treatment, the powder was washed twice with deionized water. Then, polyphosphoric acid ($H_6P_4O_{13}$) was added to the powder in an amount of 0.5 wt % based on the hydrogen absorbing alloy, and stirred at room temperature for 30 minutes. The powder was separated by decantation and dried in a vacuum dryer.

COMPARATIVE EXAMPLES 1–4

Various alloy components were mixed in such proportions as to give an alloy composition represented by $R'_{1.0}Ni_{3.8}Co_{0.7}Mn_{0.2}Al_{0.3}$ in which R' comprises 100 wt % La or 50 wt % La and 50 wt % Ce, Nd or Pr. These mixtures were worked up in the same manner as in Examples 1–8. Thus, there were obtained a total of four hydrogen absorbing alloy powders having an average particle diameter of 40 $\mu$m. However, these hydrogen absorbing alloy powders were not subjected to any surface treatment with sulfosalicylic acid or polyphosphoric acid.

COMPARATIVE EXAMPLES 5–8

Various alloy components were mixed in such proportions as to give an alloy composition represented by $R'_{1.0}Ni_{3.8}Co_{0.7}Mn_{0.2}Al_{0.3}$ in which R' comprises 20–80 wt % La and 20–80 wt % Ce. These mixtures were worked up in the same manner as in Examples 1–8. Thus, there were obtained a total of four hydrogen absorbing alloy powders having an average particle diameter of 40 $\mu$m. However, these hydrogen absorbing alloy powders were not subjected to any surface treatment with sulfosalicylic acid or polyphosphoric acid.

EXAMPLE 9 AND COMPARATIVE EXAMPLES 9–10

Various alloy components were mixed in such proportions as to give an alloy composition represented by $R'_{1.0}Ni_{3.8}Co_{0.7}Mn_{0.2}Al_{0.3}$ in which R' comprises 61 wt % La and 7 wt % Ce etc. (Example 9) or 50 wt % La and 50 wt % Ce (Comparative Examples 9 and 10). These mixtures were worked up in the same manner as in Examples 1–8. Thus, there were obtained a total of three hydrogen absorbing alloy powders having an average particle diameter of 40 $\mu$m. The hydrogen absorbing alloy powder of Example 9 was subjected to a surface treatment with sulfosalicylic acid and polyphosphoric acid. However, the hydrogen absorbing alloy powder of Comparative Example 9 was treated with polyphosphoric acid alone, and that of Comparative Example 10 was treated with sulfosalicylic acid alone.

Construction of open type batteries

A 2-g sample was taken from each of the treated alloy powders. 0.5 g of a 3 wt % aqueous solution of polyvinyl alcohol (with a degree of saponification of 98 mole % and an average degree of polymerization of 2,000) was added thereto and mixed therewith to form a paste. Thus, there were obtained a total of 19 pastes (Examples 1–9 and Comparative Examples 1–10).

A porous plate of foamed nickel measuring 30 mm×40 mm×1.2 mm and having a porosity of 94–96% was uniformly filled with each of the above 19 pastes, dried in vacuo, and then pressed. Thus, a total of 19 negative electrodes were formed.

On the other hand, positive electrodes of nickel oxide were formed of sintered nickel prepared according to a well-known method.

the capacity after 300 cycles to the maximum capacity, was calculated according to the following equation.

Retention of capacity (%)={(Capacity after 300 cycles)/(Maximum capacity)}×100

The results thus obtained are shown in Table 1.

TABLE 1

|  | Composition of R' (weight ratio) | Alloy composition (atomic ratio) | Acid treatment | Phosphorus compound | Discharge capacity in cycle 1 (mAh/g) | Discharge capacity in cycle 10 (mAh/g) | Retention of capacity after 300 cycles (%) |
| --- | --- | --- | --- | --- | --- | --- | --- |
| Example 1 | La0.5Ce0.5 | R'1.0Ni3.8Co0.7Mn0.2Al0.3 | sulfosalicyclic acid | $H_6P_4O_{13}$ | 270 | 304 | 94 |
| Example 2 | La0.4Ce0.5Pr0.1 | R'1.0Ni3.8Co0.7Mn0.2Al0.3 | sulfosalicyclic acid | $H_6P_4O_{13}$ | 268 | 304 | 95 |
| Example 3 | La0.3Ce0.5Pr0.2 | R'1.0Ni3.8Co0.7Mn0.2Al0.3 | sulfosalicyclic acid | $H_6P_4O_{13}$ | 262 | 303 | 95 |
| Example 4 | La0.2Ce0.5Pr0.3 | R'1.0Ni3.8Co0.7Mn0.2Al0.3 | sulfosalicyclic acid | $H_6P_4O_{13}$ | 245 | 300 | 96 |
| Example 5 | La0.5Ce0.4Pr0.1 | R'1.0Ni3.8Co0.7Mn0.2Al0.3 | sulfosalicyclic acid | $H_6P_4O_{13}$ | 266 | 304 | 95 |
| Example 6 | La0.5Ce0.3Pr0.2 | R'1.0Ni3.8Co0.7Mn0.2Al0.3 | sulfosalicyclic acid | $H_6P_4O_{13}$ | 262 | 304 | 95 |
| Example 7 | La0.5Ce0.2Pr0.3 | R'1.0Ni3.8Co0.7Mn0.2Al0.3 | sulfosalicyclic acid | $H_6P_4O_{13}$ | 261 | 303 | 94 |
| Example 8 | La0.4Ce0.4Nd0.2 | R'1.0Ni3.8Co0.7Mn0.2Al0.3 | sulfosalicyclic acid | $H_6P_4O_{13}$ | 255 | 302 | 96 |
| Example 9 | La0.61Ce0.07Pr0.23Nd0.09 | R'1.0Ni3.8Co0.7Mn0.2Al0.3 | sulfosalicyclic acid | $H_6P_4O_{13}$ | 274 | 303 | 65 |
| Com. Ex. 1 | La1.0 | R'1.0Ni3.8Co0.7Mn0.2Al0.3 | — | — | 231 | 335 | 32 |
| Com. Ex. 2 | La0.5Pr0.5 | R'1.0Ni3.8Co0.7Mn0.2Al0.3 | — | — | 158 | 298 | 91 |
| Com. Ex. 3 | La0.5Nd0.5 | R'1.0Ni3.8Co0.7Mn0.2Al0.3 | — | — | 152 | 296 | 88 |
| Com. Ex. 4 | La0.5Ce0.5 | R'1.0Ni3.8Co0.7Mn0.2Al0.3 | — | — | 17Z | 304 | 92 |
| Com. Ex. 5 | La0.8Ce0.2 | R'1.0Ni3.8Co0.7Mn0.2Al0.3 | — | — | 184 | 304 | 88 |
| Com. Ex. 6 | La0.6Ce0.4 | R'1.0Ni3.8Co0.7Mn0.2Al0.3 | — | — | 178 | 303 | 90 |
| Com. Ex. 7 | La0.4Ce0.6 | R'1.0Ni3.8Co0.7Mn0.2Al0.3 | — | — | 164 | 298 | 93 |
| Com. Ex. 8 | La0.2Ce0.8 | R'1.0Ni3.8Co0.7Mn0.2Al0.3 | — | — | 152 | 290 | 93 |
| Com. Ex. 9 | La0.5Ce0.5 | R'1.0Ni3.8Co0.7Mn0.2Al0.3 | — | $H_6P_4O_{13}$ | 176 | 304 | 93 |
| Com. Ex. 10 | La0.5Ce0.5 | R'1.0Ni3.8Co0.7Mn0.2Al0.3 | sulfosalicyclic acid | — | 196 | 300 | 91 |

Using separators formed of a polyolefin nonwoven fabric, the aforesaid positive electrodes were combined with the 19 negative electrodes (Examples 1–9 and Comparative Examples 1–10). Moreover, a 6N aqueous solution of potassium hydroxide was used as an electrolytic solution. Thus, a total of 19 open type nickel-metal hydride storage batteries were constructed.

A charged positive electrode was employed as a reference electrode and used in such a way as to undergo no influence of the positive electrode.

Evaluation of Capacity and Cycle Performance

Each of the batteries so constructed was charged at a constant temperature of 20° C. and a charging rate of 0.3C (180 mA) for 5 hours, and discharged at 0.2C (120 mA) until the battery voltage reached 0.8 V. This procedure was regarded as one cycle and repeated for testing purposes. The initial activity performance was evaluated by measuring the capacities in cycle 1 and cycle 10. Moreover, the cycle test was further repeated to measure the capacity after 300 cycles. Thus, the retention of capacity after repeated charging-discharging cycles, which is defined as the ratio of It can be seen from the results of Comparative Example 1 that, when R' comprises 100% by weight of La, the discharge capacities in cycle 1 and cycle 10 are high, but the cycle life is extremely poor. It has been confirmed by the results of Comparative Examples 2 and 3 that an improvement in initial capacity and cycle life can be achieved by replacing a part of La with Ce.

Moreover, with respect to each of the above-described samples, the alloy of the negative electrode having undergone 300 cycles was observed by SEM and XPS. As a result, it has been found that the alloy (a La-Ce mixture) of the negative electrode of Comparative Example 4 has the largest particle size, while the alloy (100% by weight of La) of the negative electrode of Comparative Example 1 has the smallest particle size. This indicates that the degree of particle size reduction varies according to the negative electrode. Moreover, XPS has revealed that a high concentration of Co is present on the surface of the alloy of Comparative Example 4. Since the alloys in which a part of La is replaced with Ce show an improvement in cycle life, it is believed that Ce has distinct superiority to other light rare earth elements.

It can also be seen that, when 20% by weight or more of La present in a $LaNi_5$ alloy is replaced with Ce, the resulting alloy shows an improvement in cycle life. However, when 50% by weight or more of La is replaced with Ce, the resulting alloy shows an improvement in life, but it also suffers from a retardation of initial activation and a reduction in initial capacity and maximum capacity. The reason for this is presumed to be that the particle size reduction of the alloy is greatly inhibited owing to the degree of replacement with Ce, resulting in poor activation and reduced maximum capacity.

Accordingly, the amount of Ce substituting for La should be limited within the range of 20 to 50% by weight. It is assumed that an alloy having a high capacity and a long life can preferably be obtained by using 30 to 40% by weight of Ce.

It is especially preferable that both La and Ce are present in an amount of 20 to 50% by weight, respectively. If the amount of La is greater than 50% by weight, the resulting alloy will be analogous to $LaNi_5$ alloy. When a negative electrode is formed of this alloy, the resulting alkaline absorbing battery has an extremely short charging-discharging cycle life and is hence disadvantageous from an economic point of view. If the amount of La is less than 20% by weight, the amount of hydrogen absorbed will be insufficient. When an alloy having the above-described optimum La-Ce composition is subjected to surface treatment steps, a further improvement in initial capacity and life can be achieved.

The above-described results demonstrate the effectiveness of the present invention.

What is claimed is:

1. A process for the production of a hydrogen absorbing alloy powder which comprises steps of treating a hydrogen absorbing alloy powder with an organic acid solution comprising an organic acid having a sulfur-containing group, and subsequently treating the hydrogen absorbing alloy powder with a solution containing a condensed phosphoric acid having 2 to 20 phosphorus atoms per molecule and/or phytic acid.

2. A process for the production of a hydrogen absorbing alloy powder as claimed in claim 1 wherein the organic acid solution is a solution containing at least one compound selected from the group consisting of sulfonic acids, sulfinic acids, sulfenic acids and salts thereof.

3. A process for the production of a hydrogen absorbing alloy powder as claimed in claim 1 wherein the total amount of condensed phosphoric acid and/or phytic acid used is in the range of 0.01 to 10 parts by weight per 100 parts by weight of the hydrogen absorbing alloy.

4. A process for the production of a hydrogen absorbing alloy powder as claimed in claim 2 wherein the total amount of condensed phosphoric acid and/or phytic acid used is in the range of 0.01 to 10 parts by weight per 100 parts by weight of the hydrogen absorbing alloy.

* * * * *